(No Model.) 3 Sheets—Sheet 3.

W. L. CHASE.
MACHINERY FOR MOLDING ARTICLES FROM PULP.

No. 298,731. Patented May 20, 1884.

Witnesses,

Inventor,
William L. Chase
by Marcellus Bailey
his attorney

United States Patent Office.

WILLIAM L. CHASE, OF PORTLAND, MAINE.

MACHINERY FOR MOLDING ARTICLES FROM PULP.

SPECIFICATION forming part of Letters Patent No. 298,731, dated May 20, 1884.

Application filed September 28, 1883. (No model.)

*To all whom it may concern:*

Be it known that I, WILLIAM L. CHASE, of Portland, in the county of Cumberland and State of Maine, have invented certain new and useful Improvements in Machinery for Molding or Forming Articles from Pulp, of which the following is a specification.

This invention is directed to the rapid and economical handling of dies or mold-blocks in the operation of molding articles from pulp, and to the removal of the molded article from the dies or mold-blocks with the least consumption of the operator's time. To this end, as will appear in the progress of this specification, I have arranged machinery so that one movement by the operator produces the desired effect in several molds simultaneously, and so that the discharge of the molded article may take place automatically without the operator stopping in the cycle of his movements.

Figure 1:
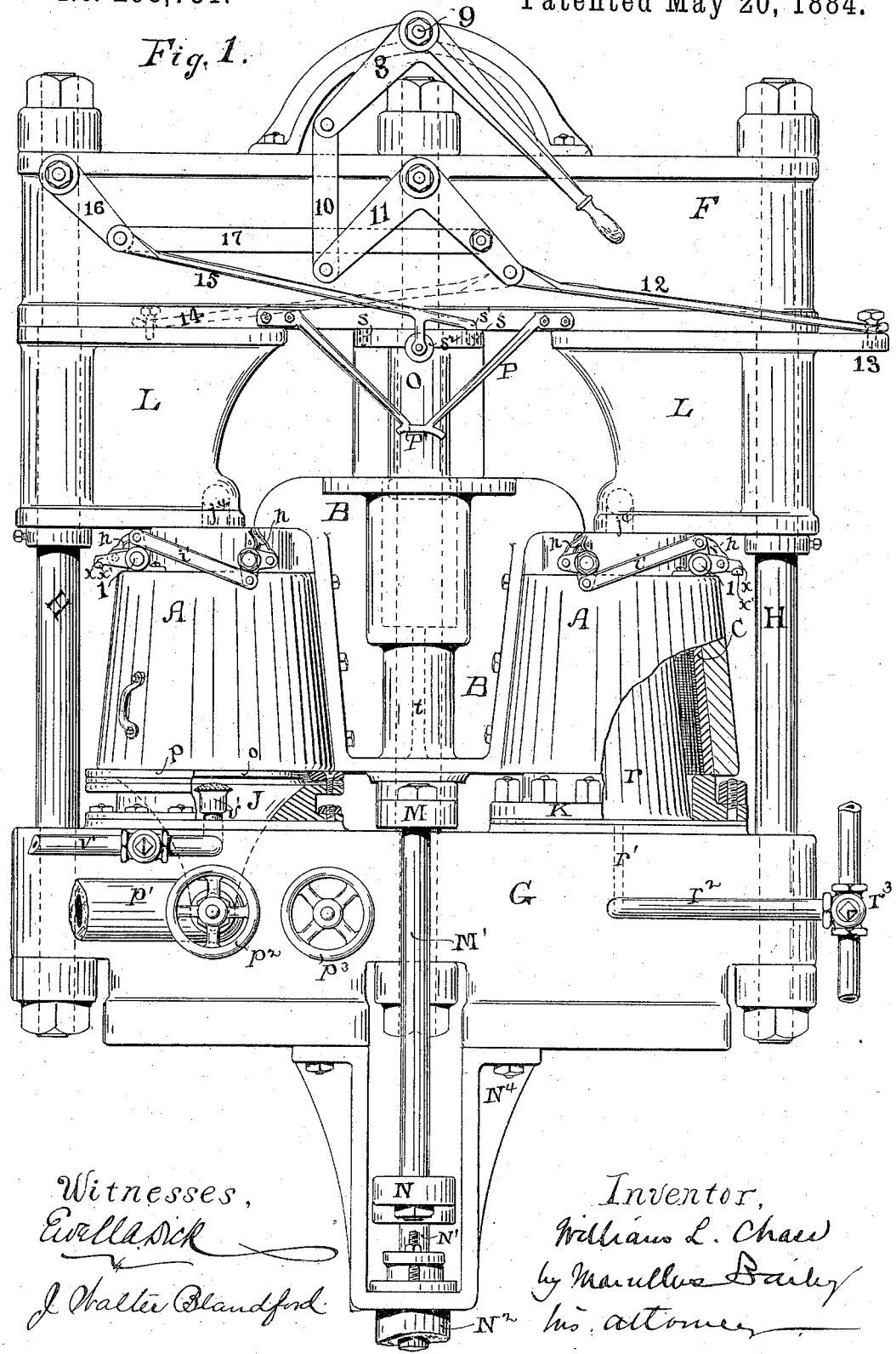
Figure 2:
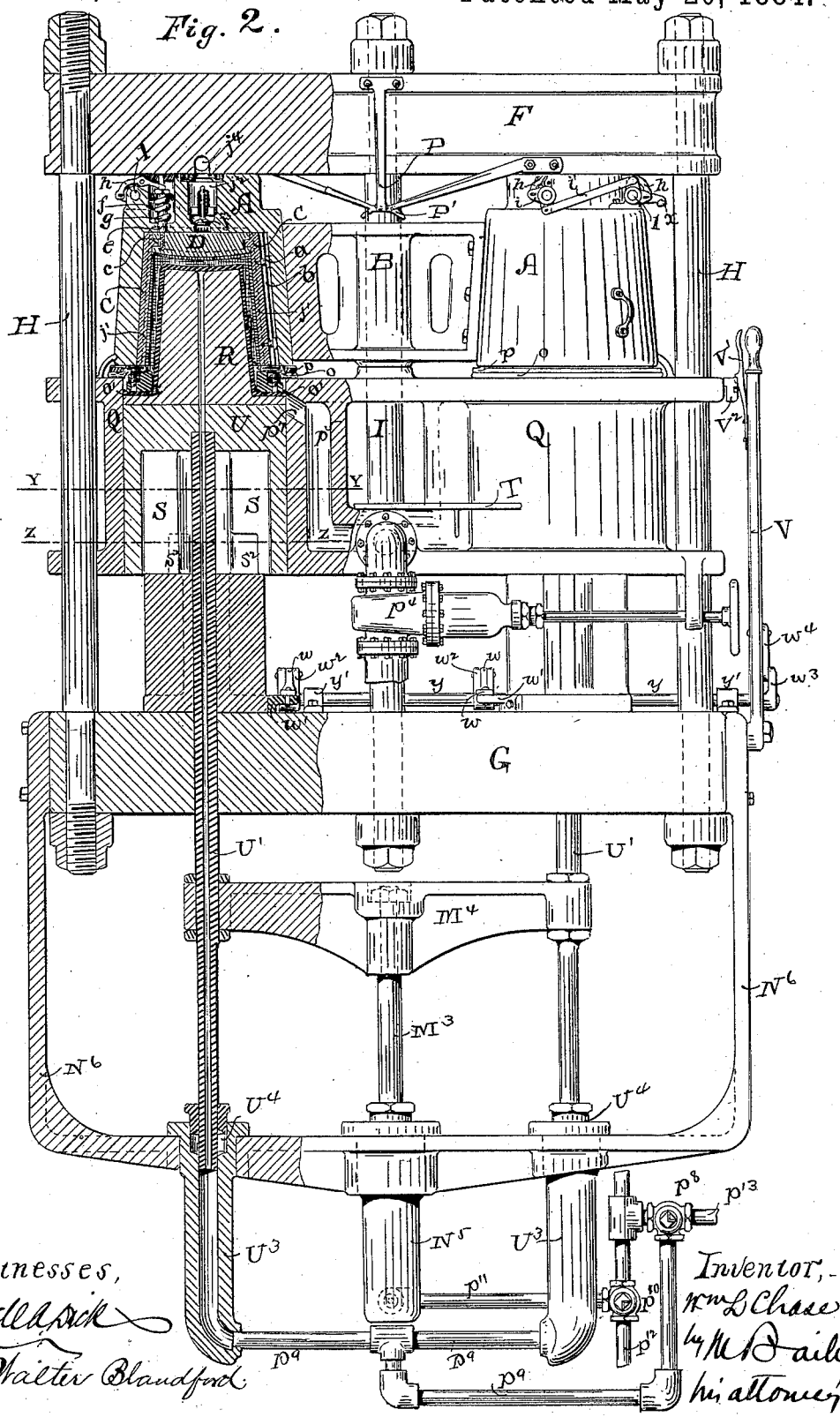
Figure 3:
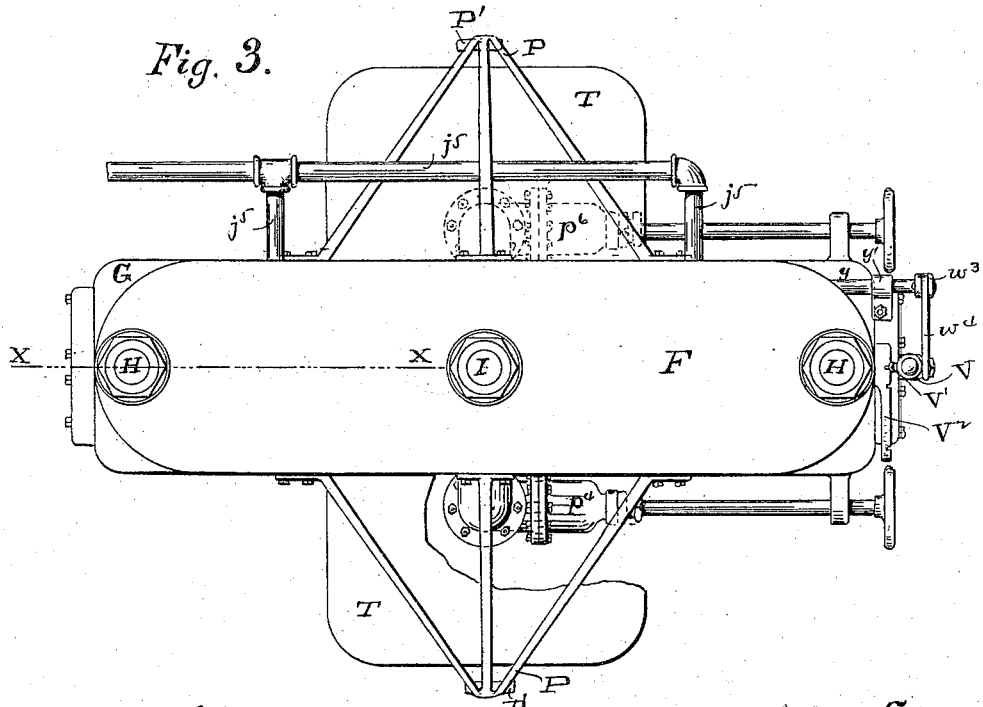
Figure 4:
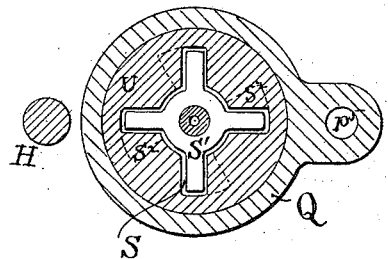
Figure 5:
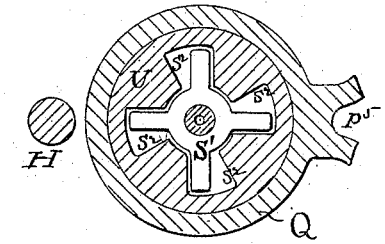
Figure 6:
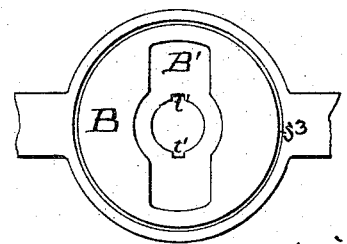

In the drawings, Figure 1 is a front elevation, partly in section, of one form of molding-machine embodying my improvements. Fig. 2 is a front elevation, partly in section, on line X X, Fig. 3, of a modified form of machine. Fig. 3 is a plan of Fig. 2. Fig. 4 is a sectional plan on line Y Y, Fig. 2. Fig. 5 is a sectional plan on line Z Z, Fig. 2. Fig. 6 is a plan of the die-yoke in Fig. 1.

In the machines illustrated in the drawings dies are employed, on the interior surfaces of which the article is formed by the deposition of pulp. My improvements, however, with such modifications for the purpose as will suggest themselves to one skilled in the art, are adapted also for use in connection with mold-blocks or forms upon the exterior surface of which the article is molded; and I desire to be understood as including this application of my improvements in my claims.

The dies shown in the drawings are improved dies, which I have made the subject of another application for Letters Patent filed September 19, 1883, Serial No. 106,841. A minute description of the construction and organization of the die is therefore unnecessary here. It is sufficient to say, by reference to Figs. 1 and 2, that each die A is hollow, with one end or head closed, and formed with interior walls flaring outwardly or toward the mouth of the die. These flaring walls are lined with a sectional shell or lining composed of longitudinal sections or staves C, which, when drawn up into normal position in the die—in which position they are represented in the drawings—fit together so as to present an unbroken inner surface of the shape to be imparted to the molded pulp article. The sections on their outer faces have a slant or inclination corresponding to the flare of the walls of the die, and are held to said walls by T-headed bolts $a$, secured to the sections and projecting into undercut or T slots $b$ in the walls of the die, the sections being thus rendered capable of longitudinal movement. Between the upper ends of the sections is a false bottom, D, in the periphery of which are sockets that are loosely entered by pins $c$, projecting from the inner faces of the section. The sections and false bottom are held up in place by spring action obtained by means of guide-pins $e$—three in number—which are screwed fast to the false bottom and pass up through holes in the head of the die into recesses $f$, where they are encircled by spiral springs, $g$, which act to draw them—and consequently the false bottom and sections—in an upward direction. The sections when moved longitudinally against the stress of their springs, follow the flaring walls of the die, and thus expand or spread apart, with the result of detaching or separating from them the molded article. In order to impart this motion to the sections the pins $e$ are depressed, and this is accomplished by means of pivoted levers $h$—one for each pin—which, when their outer ends are raised, bear at their inner ends on the pins or nuts thereon, and consequently depress them. The levers are thus actuated simultaneously and together by means of cranks $i$ and connecting-rods $i'$, by which they are connected to a rock-shaft, 1, the latter being actuated by any suitable extraneous means. The inner faces of the sections and false bottom are channeled and covered with wire-gauze, which permits egress to water, but prevents passage of particles of pulp, and the channels communicate through passages (shown by dotted lines at $j'$) with a chamber, $j^2$, in the head of the die provided with a check-valve, $j^3$, to prevent back-flow of water, and having a packing-ring at its open upper end where it communicates with a duct or pipe leading to exhaust-pump or the like.

Having briefly described the structure of the dies which I prefer to use, I now proceed to a description of the machinery in connection with which they are used.

Referring to Fig. 1, the frame of the machine consists of a cap, F, and base G, firmly bolted together by rods H H I, the two outer rods being equidistant from the center one, I. On rod I is mounted a yoke, B, so as to be capable of revolving thereon, and this yoke carries a pair of dies, A. The dies A—diametrically opposite to one another, one on each side of the axis I—register with mouth-pieces J K on the base G. Mouth-piece J is where the pulp enters, which is deposited upon the interior of the die in the operation of forming the articles. It has a packing-ring, $o$, held down by a metal ring, $p$, and loose at its inner edge, so that the pulp, as it passes up under pressure, may force the packing-ring against the mouth of the die and thus make a tight joint. The pulp, under pressure, enters through pipe $p'$, controlled by valve $p^2$. The other mouth-piece, K, consists of a ring, which holds a flexible bag, $r$, (of somewhat similar form to the article to be made,) for pressing the molded article, the object of the arrangement being to permit the article to be pressed in the same die in which it is formed, and to permit the forming operation in one die to take place simultaneously with the pressing operation in the other die. This object is attained by mounting the pair of dies so that each may be brought over the parts J K successively, and so that when one is over one mouth-piece the other will be over the other mouth-piece. The bag $r$ communicates through a passage, $r'$, in the base with a pipe, $r^2$, (controlled by valve $r^3$,) through which hydraulic pressure is admitted to the interior of the bag. A valve, of course, is also provided for relieving the pressure when it is no longer required.

It is necessary to employ means to lock down the dies securely in place against the very great upward pressure which they are called upon to sustain. To this end I make use of swinging wings L, mounted one on each side rod, H, and connected to actuating mechanism, whereby they may be swung over the dies, so as to lock them, or away from them, so as to release them, as desired. The actuating mechanism consists of an elbow-lever, 8, on the front of the machine attached to a shaft, 9, supported in bearings on top of the machine and extending from front to rear of the machine. One arm of lever 8 is the handle, by which it is moved. The other by a link, 10, is connected to one arm of a second elbow-lever, 11, which is pivoted to the frame, and at its other end is pinned to a connecting-rod, 12, which is attached to an extension, 13, on the right-hand wing L. Shaft 9 at the rear is connected by precisely the same means to the left-hand wing L, the connecting-rod 14 of which is shown in dotted lines. When the parts of the actuating mechanism are in the position shown in the drawings, the wings are in locking position over the dies. By swinging the handle end of lever 8 the two wings will be simultaneously rotated a quarter-turn, or thereabout, so as to be moved entirely away from over the dies, leaving the latter free to be raised, as they must be before they can be revolved, in order to clear the flexible bag $r$. The wings L have formed in them passages $j^4$, which, when said wings are in locking position, register with the mouths of chambers $j^2$ in the dies, and constitute the waste-pipes or passages hereinbefore referred to.

In order to raise the dies so as to clear the flexible bag $r$, the yoke B of the dies is capable not only of rotating, but also of sliding up and down on rod I, and it rests upon a cross-head, M, which is also capable of a similar sliding motion on said rod. This cross-head is, by two rods, M', (one at front and one at rear of machine,) connected to a second cross-head, N, below, which latter is fast to the piston-rod N' of a hydraulic jack, N², supported in a stirrup, N⁴, on the under side of the base of the machine. Only the upper part of the jack is shown, and I have not deemed it requisite to represent the valves, &c., by which pressure is admitted to and relieved from it.

To enable the apparatus to properly withstand the heavy pressure which must be made use of, it is requisite to lock down not only the dies A, but also their supporting-yoke B. To this end I employ a central locking-wing, O, mounted and capable of rotating on rod I, which wing, by a connecting-rod, 15, jointed to an arm, 16, pivoted to the frame of the machine, and a link, 17, connected to said parts 15 16 at their joint, and pinned at its other end to elbow-lever 11, is so connected with the mechanism for actuating the die-locking wings L that, when the latter are swung back to release the dies, the yoke-locking wing will be thrown into register with the chambered part B' (see Fig. 6) of yoke B, designed to receive said wing; and when, on the other hand, the die-locking wings are swung into locking position, the yoke-locking wing will be turned out of register with chambered part B', and will thus lock down the yoke, in which latter position it is shown in Fig. 1.

Inasmuch as the locking-wing O, when in chamber B', must turn with the yoke B, it becomes necessary to provide a detachable connection between the locking-wing and its actuating-rod 15, and to so arrange this connection that it may automatically and at the proper times be made and broken. To this end two sockets, $s$, (indicated by dotted lines,) are formed in the head or upper end of the rotating wing O on diametrically opposite sides of its axis, two sockets being needed, inasmuch as the yoke B makes only a half-revolution for each pressure. The connecting-rod 15 has at its end a lug, $s'$, which enters one or the other of these sockets when the wing is out of register with the yoke. On the connecting-rod 15 is a loose wheel, $s^2$, which, when the yoke B is raised, is lifted by the latter, and consequently acts to lift the lug $s'$ of the connecting-rod out of engagement with the wing. The wheel $s^2$ is so placed as to enter a circular groove, $s^3$, in the top of yoke B, Fig. 6, concentric with the axis of revolution of the yoke, the object of this arrangement being to keep the rod 15 from lateral movement, which might throw it out of register with the sockets in the wing O.

With a view to prevent the yoke from rotating before it is raised high enough to cause the dies to clear the flexible bag $r$, rod I, for a suitable distance on its lower part, is provided with splines $t$, (seen in dotted lines in Fig. 1,) which enter grooves $t'$, Fig. 6, in the lower part of the yoke. Until the yoke is raised out of engagement with these splines it cannot revolve.

In order to conveniently impart at the proper time the requisite movement to the discharging mechanism, whereby the sectional lining of the dies is caused to expand or spread apart, I make use of a cam or wiper, P, located on the machine at such a point that when the die in which the formed article has been pressed and finished leaves the mouth-piece K to return to mouth-piece J, said wiper will meet the handle $x$ of the discharging-mechanism, and will move it in the proper direction, and to the necessary extent, to cause the longitudinal movement of the die-sections requisite to loosen the molded article and permit its easy discharge from the die.

The cam of the device P is shown in plan in in Fig. 3 (the machine shown in Figs. 2 and 3 being in this respect a counterpart of Fig. 1, except that Fig. 1 has the projection P only on front side) as projecting laterally from the inside of arm P, and over this part P' rides the lateral projection or lug $x'$ of handle $x$.

I have found in practice that the perforations in the die after a time become clogged with fine particles of pulp, thus impeding the free passage of water. To remedy this, I provide a pipe, $v$, which extends up into mouth-piece J and terminates in a spray-nozzle or rose, $v'$, through which water, under pressure, can be forced into the die, thus washing out the lodged particles of pulp.

The waste-passages $j^4$ in the wings L connect with flexible tubing, which in turn is connected to a suitable exhaust-pump for conveying away the expressed water; or the tubing may in some instances be put in communication with proper waste-pipes without the intervention of a pump.

The operation of the apparatus is as follows: The dies A, being in the position shown in Fig. 1, and locked by the wings L L O, valve $p^2$ is opened, thus admitting to the interior of the left-hand die A the fluid-pulp, which is maintained under pressure in a suitable reservoir, (not shown,) whence it passes through pipe $p'$ into the die. The water contained in the pulp passes through the perforations and grooves in the sectional lining and false bottom into chamber $j^2$, and out and away through the discharge-passage $j^4$, in left-hand wing L, until a thickness of pulp is deposited upon the inner face of the sectional lining or shell sufficient to make the molded article of requisite strength. This thickness can be regulated by the character and consistency of the pulp, by the degree of pressure maintained in the reservoir, and by the length of time the operation is continued, and is determined by trial. The proper thickness having been obtained, valve $p^2$ is closed, and valve $p^3$, which controls an escape-passage leading from mouth-piece J at the back of the machine, is opened, thus allowing the surplus pulp to flow out from the machine back into a stuff-chest, (not shown,) to be again pumped into the reservoir. Hand-lever 8 is now moved in the proper direction, and far enough to revolve the locking-wings L L O a quarter-turn on their respective rods or axes, thus releasing the dies and leaving them free to be raised. Hydraulic pressure is admitted to the jack $N^2$, and the dies are thereby lifted until they clear the flexible bag, at which time they are free to revolve. They are then given a half-revolution on their axis I, the direction of revolution being such that the left-hand die A, which contains the deposited pulp, moves around by the rear of the machine. At the end of the half-revolution the dies will have reversed their positions, the empty right-hand die being over mouth-piece J, and the left-hand die, with its deposited film of pulp, being over K. The dies are now lowered by relieving the hydraulic jack of pressure, thus bringing the die that has received the film of pulp down upon or about the flexible bag $r$, and they are locked in place by the locking-wings. The operation of depositing the pulp is now repeated with the second die; and while this is being done hydraulic pressure is admitted to the interior of the flexible bag $r$, the bag is distended, and the pulp coating upon the interior of the die, upon which the deposit was first made, is compacted to any extent within the strength of the die. A sufficient thickness of pulp having been obtained in the second die, that operation is arrested. The flexible bag $r$ in the first die is also relieved of pressure. The locking-wings are swung back, and the dies are then lifted and given a half-revolution in the same direction as before. During this movement the handle $x$ of the discharging mechanism of the die containing the compacted and finished article comes in contact with the cam or wiper P, and is thereby moved so as to actuate the discharging mechanism to cause the longitudinal movement and consequent expansion or spreading apart of the section C of the lining, thus automatically loosening and detaching therefrom the formed article, which is free to drop or descend from the die upon a ledge, stand, or table, which may be placed below in proper position to receive it. Thus the operation of depositing a film of pulp upon the interior surface of one die and of pressing or compacting an already deposited film of pulp in the other die take place contemporaneously.

In the modified machine represented in Figs. 2 and 3 the pair of dies have rotary movement on the axis I, as in the preceding figure; but in order to enable them to clear the flexible bag, the part which supports the bag, &c., rises and descends, instead of the dies having this movement. The machine is further modified in that two flexible bags are employed, so that the operations of forming and pressing the molded article can be carried on in the same die without shifting it from one to the other mouthpiece, as in the other machine. Thus two articles are made at one operation; and in order to discharge the formed article two sets of wipers, P—one on each side of the machine—are employed, so that as the dies are swung around on their axis the handles $x$ of both of them will be operated to effect the loosening and disengagement of the molded articles in the two dies.

Referring to Figs. 2 and 3, the dies A, with their connecting-yoke B, are mounted so as to fit nicely and turn easily on the vertical axis I, between the cap F and packing-rings $o$, secured by metal rings $p$ to the faces of stationary cylinders Q, intermediate between cap F and base G of frame.

In order to permit the revolution of the dies, the two flexible bags (the left one of which is shown in section) are mounted upon blocks R, which form a part of pistons which may be lowered within the cylinders Q, so that the ends of the bag-blocks will clear the faces of the packing-rings $o$. The pistons are provided with recesses S, which register with wings S' (shown in Fig. 4) when the pistons are drawn down in the cylinders. These wings may be revolved on their central axes when the pistons are in position shown in Fig. 2, so as to come under the solid part of the pistons (see Fig. 4) and lock them securely. The mechanism by which the wings S' are revolved consists of links $w$, connecting-ears $w'$, projecting from the wing to forked arms $w^2$ on the shaft $y$, carried in bearings $y'$ on the base of the machine. This shaft is in turn connected by means of forked arm $w^3$ and link $w^4$ to the lever V, by which the shaft $y$, and with it the wings, may be given a part of a revolution. Lever V is secured in its proper positions by spring V' and catch-arc $V^2$. The pistons carrying the bag-blocks are lifted by means of the hydraulic jack $N^5$, supported in the stirrup $N^6$, depending from the base of the machine, and its connections, piston-rod $M^3$, and cross-head $M^4$, to the ends of which are fastened the piston-rods U', which carry pistons U, and form the axes on which wings S' revolve.

To provide for the admission of water-pressure to the bags, the piston-rods U' are made hollow, the hole therein extending up through the blocks R. The lower ends of the piston-rods U' play in cylinders $U^3$, provided with stuffing-boxes $U^4$, by which arrangement hydraulic connection is made while permitting the free vertical movement necessary to the hollow piston-rods U'.

Pulp is admitted to the molds by the means of the valve $p^4$ and passages $p^5$ on the sides of the cylinders Q, and surplus is exhausted from the mold by means of valve $p^6$, (shown in dotted lines, Fig. 3,) also communicating with passages $p^5$.

To avoid pumping into and emptying from the mold much surplus pulp, the mold-blocks are arranged to be lowered just enough to uncover the feed-openings $p^7$, in which position they occupy a large part of the space inside the dies, but still have ample room for the proper action of the pulp in operation, and in which position they are held by turning the wings under ledges $S^2$ in the pistons, shown in Fig. 5; also by dotted lines, Fig. 4, and in the sectional side, Fig. 2. The projecting flanges of the flexible bags make a packing for the cylinders, as seen at O', Fig. 2. Handles are attached to the dies to facilitate revolving them.

Operation: The pistons and bag-blocks being in the position last mentioned, valve $p^4$ is opened, admitting pulp simultaneously to both dies from a reservoir (not shown) in which pulp is maintained under pressure. When a sufficient deposit is obtained—this being determined by trial—valve $p^4$ is closed, and the surplus flowed out by means of valve $p^6$ back to a chest, to be again pumped into the reservoir. Pistons U and bag-blocks R are now lifted into the position shown in Fig. 2, by admitting hydraulic pressure to the jack $N^5$, and are locked there by throwing over the lever V. Hydraulic pressure is now admitted to the flexible bags through valve $p^8$, pipe $p^9$, cylinders $U^3$, and hollow piston-rods U', distending the bags and pressing the deposited films of pulp to any extent permitted by the hydraulic pressure maintained and the strength of dies. Pressure is now relieved in the bags, the wings are revolved to register with the channels or recesses in the pistons, and the bag-blocks are lowered to clear the faces of the packing-rings. The dies are now revolved a half-revolution, in the course of which the handles $x$ of the releasing-gear on the dies come in contact with the cams or wipers P, thereby discharging the molded articles from the two dies upon the ledges $S^2$, and leaving the dies empty for a repetition of the operation.

I have here represented and described the simplest forms of machines embodying the principles of my invention. The complex or multiplex forms can be more readily understood now by simple reference to modifications than if I had complicated the descriptions of the illustrated machines to that extent. Instead of two dies, there may be four, in which case the cap and base would occupy the form of a cross, and be bolted together conveniently with five rods, the four dies revolving about a central rod, and there being a sufficient space in each angle of the cross for the deposit of the molded articles during the revolution of the dies; or there may be six or any convenient number of dies arranged about a central rod or axis, and with spaces in the circle of revolution of the dies for the deposit of the articles.

In some instances the molded article can be given sufficient strength by compacting the deposited film of pulp by means of air-pressure instead of the bag and hydraulic pressure. It will therefore be desirable sometimes to modify Fig. 1 for this purpose. Bag $r$ would be left off and the base fitted with the mouth-pieces J, with air-passages and valves leading thereto. The hydraulic jack for lifting the dies and the locking-gear would also be left off, the dies simply revolving between the cap and the faces of the packing-rings.

What I claim herein as new and of my invention is as follows:

1. In machinery for molding articles from pulp, the combination of dies rotatable upon a common axis with discharging or disengaging mechanism, whereby the formed articles are loosened or disengaged from the dies, and means, substantially as described, whereby said disengaging mechanism is automatically operated during the rotary movement of the dies to effect the loosening of the formed article or articles, substantially as hereinbefore set forth.

2. The combination, with dies rotatable upon a common axis, of mouth-pieces or their equivalents, which co-operate with the die in the operation of forming or pressing the article, said mouth-pieces and dies being movable relatively to one another in the direction of the length of the dies so as to permit the two to separate far enough to allow the revolution of the dies, substantially as and for the purposes hereinbefore set forth.

3. In machinery for molding articles from pulp, the combination, with dies or mold-blocks rotatable upon a common axis, of mechanism for locking the same in operative position, and also for unlocking them so as to leave them free to be revolved, substantially as and for the purposes hereinbefore set forth.

4. In machinery for molding articles from pulp, the combination, with dies or mold-blocks rotatable upon a common axis, of mechanism for locking them in operative position, and also for unlocking them so as to leave them free to be revolved, and means whereby the formed or molded articles are automatically loosened or disengaged during the rotary movement of the same, substantially as and for the purposes hereinbefore set forth.

5. The combination of the rotatable dies, the reciprocatory piston-blocks and flexible bags carried by the same, and means for actuating said parts and for locking and releasing the same, substantially as hereinbefore described with reference to Figs. 2 and 3 of the accompanying drawings.

6. The combination, with the reciprocatory piston-blocks and the flexible bags carried by the same, of the hollow piston-rods for supporting the same, and means whereby air or hydraulic pressure can be introduced into the flexible bags through said hollow piston-rods.

In testimony whereof I have hereunto signed my name this 26th day of September, A. D. 1883.

WM. L. CHASE.

Witnesses:
 EWELL A. DICK,
 J. WALTER BLANDFORD.